(12) United States Patent
Obukhov et al.

(10) Patent No.: US 10,444,998 B1
(45) Date of Patent: Oct. 15, 2019

(54) DATA STORAGE DEVICE PROVIDING DATA MAINTENANCE SERVICES

(71) Applicant: Western Digital Technologies, Inc., Irvine, CA (US)

(72) Inventors: Dmitry S. Obukhov, San Jose, CA (US); Marc A. Bombet, Coto de Caza, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 700 days.

(21) Appl. No.: 14/673,392

(22) Filed: Mar. 30, 2015

Related U.S. Application Data

(63) Continuation-in-part of application No. 14/133,302, filed on Dec. 18, 2013, now Pat. No. 9,330,143.

(60) Provisional application No. 61/895,263, filed on Oct. 24, 2013.

(51) Int. Cl.
  *G06F 12/00* (2006.01)
  *G06F 3/06* (2006.01)

(52) U.S. Cl.
  CPC ............ *G06F 3/061* (2013.01); *G06F 3/0641* (2013.01); *G06F 3/0644* (2013.01); *G06F 3/0688* (2013.01)

(58) Field of Classification Search
  None
  See application file for complete search history.

(56) References Cited

U.S. PATENT DOCUMENTS

| | | | |
|---|---|---|---|
| 6,070,170 A | 5/2000 | Friske et al. | |
| 6,401,185 B1 | 6/2002 | Sexton et al. | |
| 6,446,062 B1 | 9/2002 | Levine et al. | |
| 6,466,062 B2 | 10/2002 | Escobar-Bowser | |

(Continued)

FOREIGN PATENT DOCUMENTS

| CN | 1387125 A | 12/2002 |
|---|---|---|
| CN | 101715575 A | 5/2010 |

(Continued)

OTHER PUBLICATIONS

International Search Report and Written Opinion dated Jan. 27, 2015 from related PCT Serial No. PCT/US2014/062066, 9 pages.

(Continued)

*Primary Examiner* — Jason W Blust
(74) *Attorney, Agent, or Firm* — Morgan, Lewis & Bockius LLP

(57) ABSTRACT

Systems and methods are disclosed for performing data maintenance and/or other data operations within a data storage device. A data storage device is disclosed including a device controller, non-volatile data storage, an interface for receiving data storage commands from a host system, a framework including a memory for storing xenocode code received from the host system, and a processor for executing the xenocode. The device controller is configured to write user data received from the host system to a first partition of the non-volatile data storage in response to a storage command received via the interface from the host system. The xenocode, when executed, causes the processor to read the user data from the first partition of the non-volatile data storage, perform data operations on the read user data, and write results associated with the data operations in a second partition of the non-volatile data storage.

22 Claims, 11 Drawing Sheets

(56) References Cited

U.S. PATENT DOCUMENTS

| | | |
|---|---|---|
| 6,549,977 B1 | 4/2003 | Horst et al. |
| 6,856,556 B1 | 2/2005 | Hajeck |
| 7,055,015 B2 | 5/2006 | Shiota |
| 7,126,857 B2 | 10/2006 | Hajeck |
| 7,424,478 B2 | 9/2008 | Licon et al. |
| 7,430,136 B2 | 9/2008 | Merry, Jr. et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,555,621 B1 * | 6/2009 | Pavlyushchik ....... G06F 3/0611 711/162 |
| 7,596,643 B2 | 9/2009 | Merry, Jr. et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,733,712 B1 | 6/2010 | Walston et al. |
| 7,765,373 B1 | 7/2010 | Merry et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,078,918 B2 | 12/2011 | Diggs et al. |
| 8,090,899 B1 | 1/2012 | Syu |
| 8,095,851 B2 | 1/2012 | Diggs et al. |
| 8,108,692 B1 | 1/2012 | Merry et al. |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,243,525 B1 | 8/2012 | Kan |
| 8,254,172 B1 | 8/2012 | Kan |
| 8,261,012 B2 | 9/2012 | Kan |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 * | 11/2013 | Kan ...................... G06F 3/0622 711/202 |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 9,330,143 B2 | 5/2016 | Obukhov et al. |
| 9,740,439 B2 | 8/2017 | Franceschini et al. |
| 2002/0116457 A1 | 8/2002 | Eshleman et al. |
| 2002/0178328 A1 | 11/2002 | Honda et al. |
| 2004/0225831 A1 | 11/2004 | Pail et al. |
| 2006/0143238 A1 | 6/2006 | Tamatsu |
| 2007/0204126 A1 | 8/2007 | Bangalore |
| 2007/0204204 A1 | 8/2007 | Lee et al. |
| 2008/0071785 A1 | 3/2008 | Kabra et al. |
| 2008/0140918 A1 | 6/2008 | Sutardja |
| 2009/0138654 A1 | 5/2009 | Sutardja |
| 2009/0288101 A1 | 11/2009 | Gandin et al. |
| 2010/0174849 A1 | 7/2010 | Walston et al. |
| 2010/0250793 A1 | 9/2010 | Syu |
| 2010/0287327 A1 | 11/2010 | Li et al. |
| 2011/0099323 A1 | 4/2011 | Syu |
| 2011/0283049 A1 | 11/2011 | Kang et al. |
| 2011/0296440 A1 | 12/2011 | Laurich et al. |
| 2012/0158753 A1 | 6/2012 | He et al. |
| 2012/0179869 A1 | 7/2012 | Flynn et al. |
| 2012/0221534 A1 | 8/2012 | Gao et al. |
| 2012/0260020 A1 | 10/2012 | Suryabudi et al. |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0179753 A1 | 7/2013 | Flynn et al. |
| 2013/0205183 A1 | 8/2013 | Fillingim et al. |
| 2013/0227236 A1 | 8/2013 | Flynn et al. |
| 2013/0282953 A1 | 10/2013 | Orme et al. |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0181804 A1 * | 6/2014 | Sakata .................. G06F 9/455 718/1 |
| 2014/0215129 A1 | 7/2014 | Kuzmin et al. |
| 2014/0223255 A1 | 8/2014 | Lu et al. |
| 2014/0358876 A1 | 12/2014 | Bhattacharjee et al. |
| 2015/0039573 A1 | 2/2015 | Bhattacharjee et al. |
| 2015/0046486 A1 * | 2/2015 | Asaad ............... G06F 17/30442 707/765 |
| 2015/0120770 A1 | 4/2015 | Obukhov et al. |
| 2016/0034529 A1 * | 2/2016 | Nguyen ............. G06F 16/2471 707/713 |

FOREIGN PATENT DOCUMENTS

| | | |
|---|---|---|
| CN | 102651007 A | 8/2012 |
| CN | 103238305 A | 8/2013 |
| EP | 2541423 A1 | 1/2013 |
| WO | WO-2008/070173 A1 | 6/2008 |

OTHER PUBLICATIONS

Sungchan Kim, et al., "Fast, Energy Efficient Scan inside Flash Memory SSDs," The Second International Workshop on Accelerating Data Management Systems using Modern Processor and Storage Architecture (ADMS' 11), 2011, pp. 1-8.

Chinese Office Action from Chinese Application No. 201480058389. 3, dated Oct. 18, 2016.

Boncz, "MonetDB/Xquery: A fast Xquery processor powered by a relational engine," ACM, Jun. 27, 2006, pp. 479-490.

(56) References Cited

OTHER PUBLICATIONS

Extended European Search Report from European Application No. 14855008.0, dated Mar. 30, 2017.

* cited by examiner

| L PAGES | L PAGE 0 | L PAGE 1 | L PAGE 2 | L PAGE 3 | L PAGE 4 | ... | L-Page N-1 |
|---|---|---|---|---|---|---|---|
| DB FIELDS | NAME | ADDRESS | PHONE | SSN | ACCOUNT NO. | ... | FIELD N-1 |

*FIG. 3B*

DATA STORAGE DEVICE PROVIDING DATA MAINTENANCE SERVICES

CROSS-REFERENCE TO RELATED APPLICATIONS

This application is a continuation-in-part of U.S. patent application Ser. No. 14/133,302, filed Dec. 18, 2013, entitled "Data Storage Device Supporting Accelerated Database Operations," which claims the benefit of U.S. Provisional Patent Application No. 61/895,263, filed Oct. 24, 2013, entitled "Data Storage Device Supporting Accelerated Database Operations," the disclosures of which are hereby incorporated by reference in their entirety.

BACKGROUND

Technical Field

This disclosure relates to non-volatile data storage devices and methods for accelerating data operations in such devices.

Description of the Related Art

Database operations are often performed in an environment where speed of execution is of great importance. Common operations such as returning query results and indexing are often I/O-intensive and consume much data bandwidth between a host system (e.g., computing device) and a data storage device at which such operations are executed.

BRIEF DESCRIPTION OF THE DRAWINGS

Various embodiments are depicted in the accompanying drawings for illustrative purposes, and should in no way be interpreted as limiting the scope of this disclosure. In addition, various features of different disclosed embodiments can be combined to form additional embodiments, which are part of this disclosure.

FIGS. 3A and 3B are block diagrams showing example layouts of database elements according to one embodiment.

DETAILED DESCRIPTION

Figure 1A:
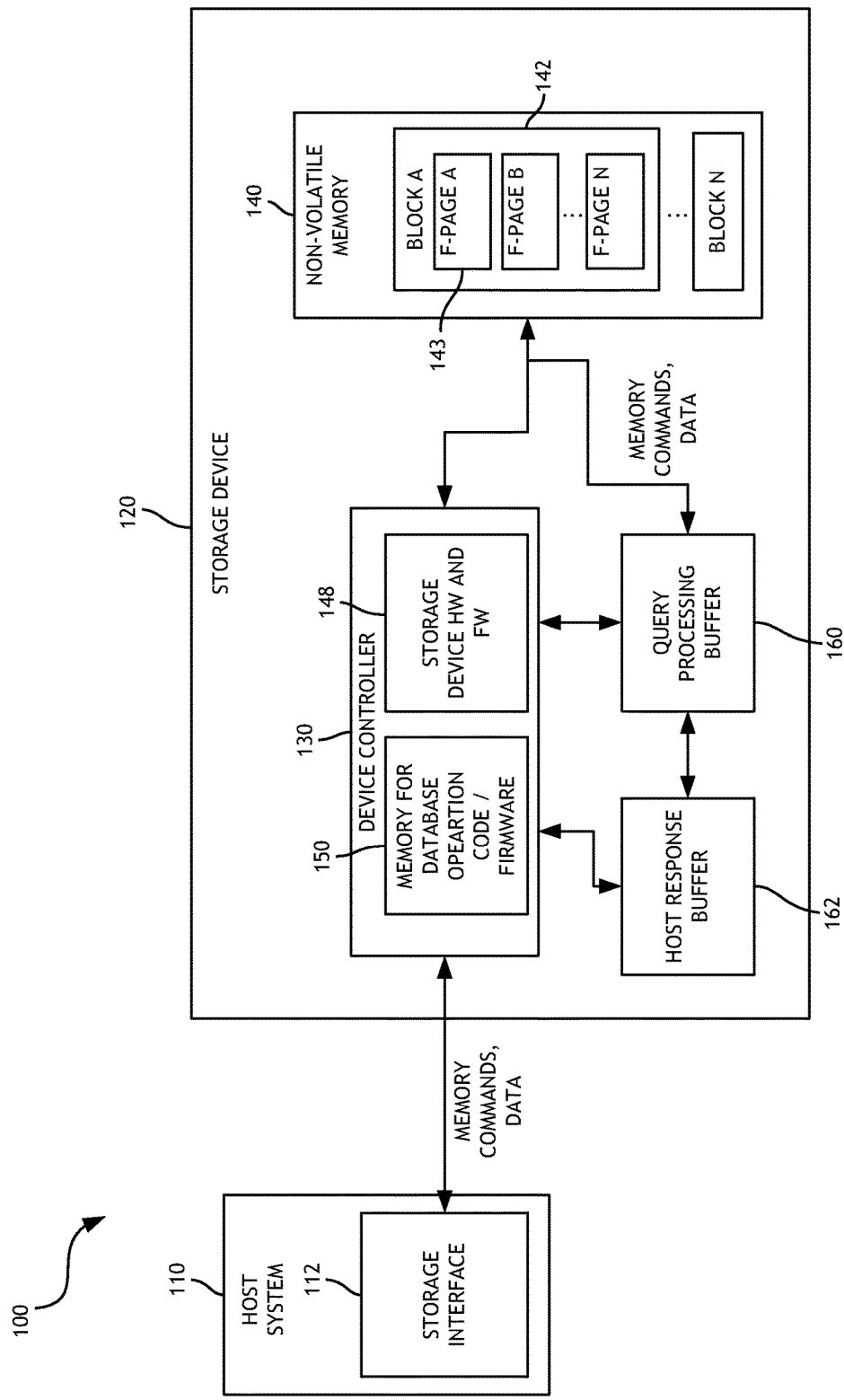
FIG. 1A illustrates an example data storage device according to one or more embodiments.

While certain embodiments are described, these embodiments are presented by way of example only, and are not intended to limit the scope of protection. Indeed, the novel methods and systems described herein may be embodied in a variety of other forms. Furthermore, various omissions, substitutions and changes in the form of the methods and systems described herein may be made without departing from the scope of protection.

The headings provided herein are for convenience only and do not necessarily affect the scope or meaning of the claims. Disclosed herein are example configurations and embodiments relating to on-drive data analysis/maintenance.

Overview

Certain data storage devices and systems store user data that is accessible by a host device or system. It may be desirable for certain data maintenance or other operations to be performed on such data stored within the data storage device/system. Generally, the host system may read back the relevant data stored in the data storage device for the purpose performing data maintenance/analysis externally to the data storage device. However, such implementation can occupy bandwidth over the interface connecting the host system to the data storage device, and can further require host resources for performance of the data maintenance/analysis operations.

Certain embodiments disclosed herein provide for implementation of on-drive data maintenance, analysis, and/or other data operations with respect to user data stored in non-volatile storage of the data storage device/drive. Therefore, the systems and methods disclosed herein may allow for the offloading of data maintenance operations from host processing to the storage device.

While data storage devices often have not been data-aware, embodiments disclosed herein provide for intelligent data storage devices configured to exercise data awareness in processing host-supplied user data. By performing data maintenance/analysis operations on the data storage device, such operations may be performable without the need to export the data to the host, advantageously providing relatively efficient bandwidth utilization in certain embodiments. In certain embodiments, data analysis/maintenance operations may require relatively expansive data exchange with the storage device. By performing at least part of such operations on the data storage device, operations such as statistical analysis, indexing, search for virus patterns, can be offloaded from the host CPU and from the interface, possibly providing better utilization of computational power and bandwidth in server products.

Certain embodiments provide for on-drive data maintenance/analysis operation performance using externally-sourced code. The data storage device may be configured to execute external host-supplied code for implementing the various data operations. In certain embodiments, the framework for implementing the external code may utilize a dedicated partition of the data storage device's non-volatile data storage for managing data generated in association with the performance of data operations. The framework may access user data stored in a user data partition of the non-volatile storage of the data storage device for the purposes of analyzing the user data.

Certain embodiments disclose a data storage device comprising a device controller, non-volatile data storage, an interface for receiving data storage commands from a host system, a framework including a memory for storing xenocode code received from the host system, and a processor for executing the xenocode. The device controller may be configured to write user data received from the host system to a first partition of the non-volatile data storage in response to a storage command received via the interface from the host system. The xenocode, when executed, may cause the processor to read the user data from the first partition of the non-volatile data storage, perform data operations on the read user data, and write results associated with the data operations in a second partition of the non-volatile data storage.

Certain embodiments provide a process of performing data operations in a data storage device comprising non-volatile data storage and a memory. The process may involve receiving xenocode comprising processor executable instructions from a host system, storing the xenocode in a memory of a framework for storing and executing the xenocode in a data storage device, receiving a storage command from the host system over a communication interface, writing user data associated with the storage command and received from the host system to a first partition of a non-volatile data storage of the data storage device in response to receiving the storage command. The process may further involve executing the xenocode to cause a processor of the framework to read the user data from the first partition of the non-volatile data storage, perform data operations on the read user data, and write results associated with the data operations in a second partition of the non-volatile data storage.

Data Storage System

FIG. 1A illustrates an example data storage device 120 according to one embodiment of the invention. As is shown, a data storage device 120 (e.g., solid state drive, hybrid drive, etc.) includes a device controller 130 and a non-volatile solid-state memory 140, which comprises one or more units of storage, such as blocks of storage. FIG. 1A illustrates an example where the blocks are identified as block "A" 142 through block "N." While a single non-volatile solid-state memory 140 is illustrated for convenience, the storage device may include multiple of such memories. Each block of the non-volatile solid-state memory 140 comprises a plurality of flash pages (F-pages). For example, block A 142 of FIG. 1A includes a plurality of F-pages, identified as F-pages A 143, B, through N. In some embodiments, each "F page" is a smallest grouping of memory cells in the non-volatile solid-state memory 140 that can be programmed in a single operation or as a unit. In lieu of or in addition to the non-volatile solid-state memory 140, a magnetic rotating media and/or other non-volatile memory such as MRAM and/or phase change memory may be used.

The controller 130 can receive data and/or storage access commands from a storage interface 112 (e.g., a device driver) in a host system 110. Storage access commands communicated by the storage interface 112 can include write and read commands issued by the host system 110. The commands can specify a logical block address in the data storage device 120, and the controller 130 can execute the received commands in the non-volatile solid-state memory 140. In a hybrid hard drive, data may be stored in magnetic media storage component (not shown in FIG. 1A) in addition to the non-volatile solid-state memory 140.

The data storage device 120 can store data received from the host system 110 so that the data storage device 120 can act as memory storage for the host system 110. To facilitate this function, the controller 130 can implement a logical interface. The logical interface can present to the host system 110 the storage device's memory as a set of logical addresses (e.g., contiguous address) where data can be stored. Internally, the controller 130 can map logical addresses to various physical memory addresses in the non-volatile solid-state memory 140 and/or other memory module(s).

In one embodiment, the device controller 130 includes storage device hardware and firmware 148 and a memory for database operation code/firmware 150. The storage device hardware and firmware 148 is/are used to control data operations within the data storage device. In one embodiment, the database operation code/firmware in memory 150 is configurable by the host, and can be executed in its own dedicated processor (not shown in FIG. 1A). The code in memory 150 may be xenocode, as described in greater detail below. Those queries are executed against data stored in the non-volatile solid-state memory 140. Data related to the queries are temporarily stored in a query processing buffer 160 and results are returned to the host system 110 via a host response buffer 162. Additional details related to how the components interact are provided below. The memory 150, host response buffer 162 and/or query processing buffer 160 may provide a framework for storing and executing xenocode that complements the storage device firmware. It is noted that these components may be arranged differently in various embodiments. They may be omitted, combined, or separated into further sub-components. Also, components 148, 150, 160, and 162 may be integrated into a single processor package or implemented as various discrete components in communication with one another.

Figure 1B:
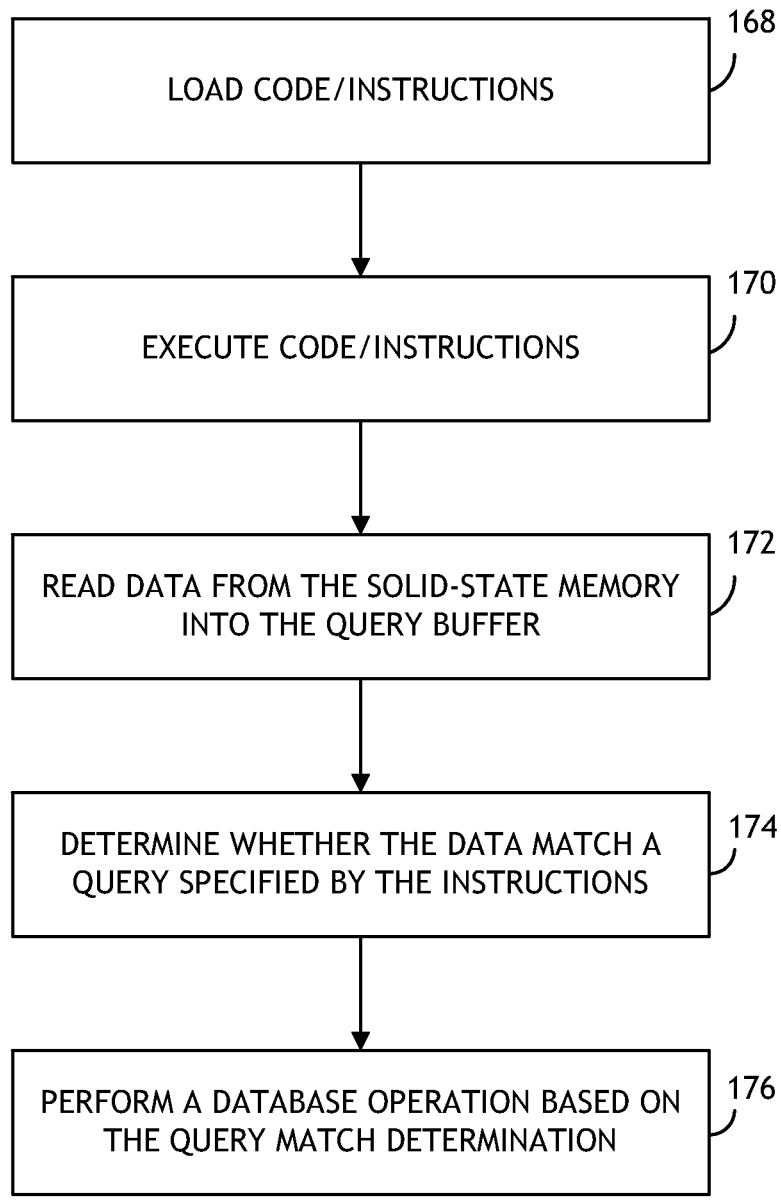
FIG. 1B illustrates an example database operation acceleration method according to one or more embodiments.

FIG. 1B illustrates an example database operation acceleration method according to one embodiment. In one embodiment, the controller 130 is configured to perform the flow shown in FIG. 1B. At block 168, the controller is configured to load instructions/code into the memory 150. The instructions/code may be from a host system. At block 170, the controller is configured to execute instructions in the memory 150. In one embodiment, a dedicated processor may be used to handle the executions to provide further acceleration. At block 172, the controller is configured to cause data to be read from the solid-state memory 140 into the query processing buffer 160. At block 174, the controller is configured to determine whether the data match a database query specified by the instructions. At block 176, the controller is configured to perform a database operation based on the query match determination. In one embodiment, one or more actions in blocks 172-176 may be triggered as a result of executing the instructions. As will be explained further below, the database operation performed may include, for example, one or more of: (1) returning data matching the query to the host system 110; (2) adding an indication to an index when the data matches the query; (3) modifying the data matching the query and writing the modified data back to the solid-state memory.

Acceleration of Database Operations

Figure 2:
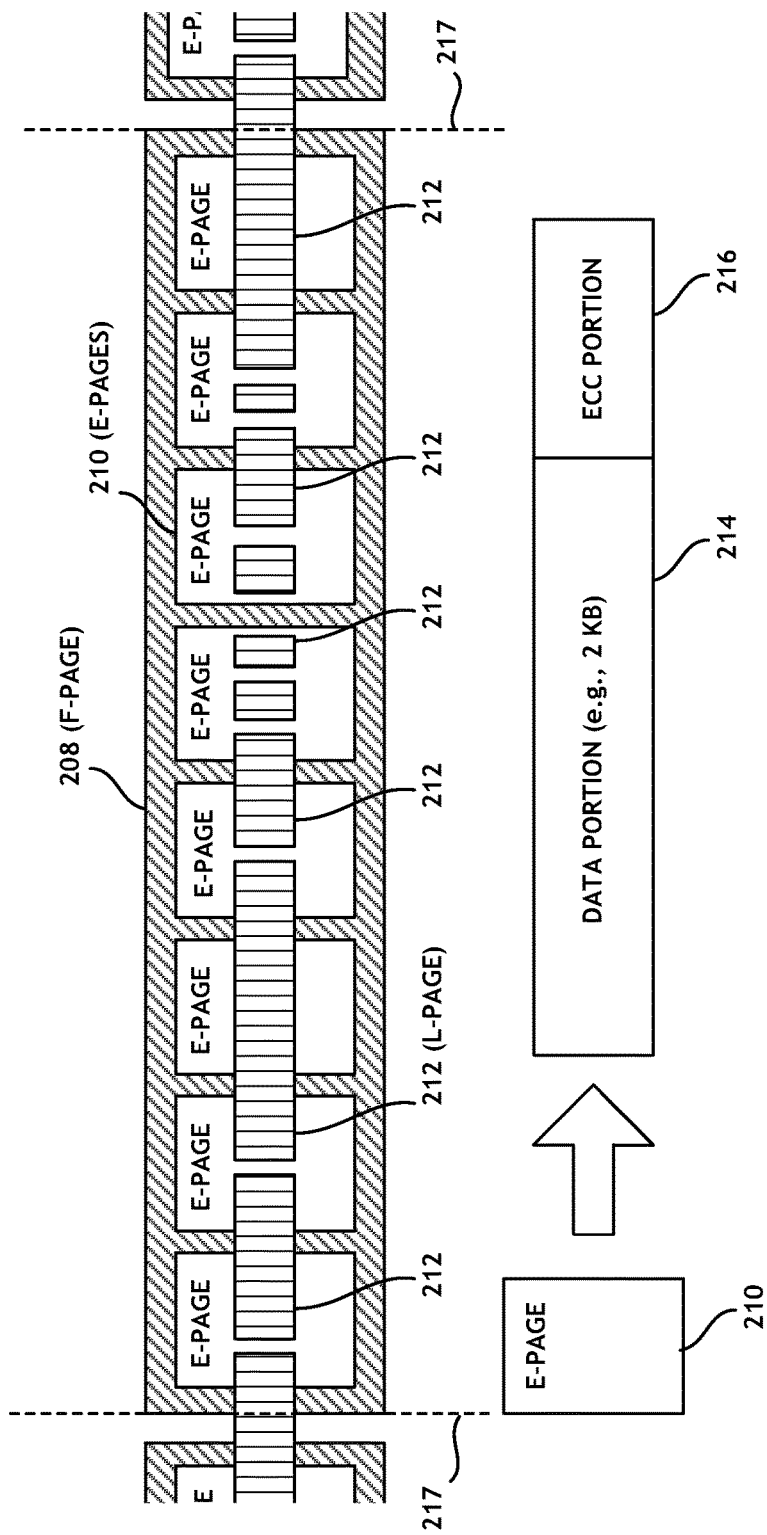
FIG. 2 shows the internal data layout of the data storage device according to one or more embodiments.

FIG. 2 shows the internal data layout of the data storage device according to one embodiment. As shown, logical pages (L-Pages) 212 of variable size are stored across various error correction pages (E-Page 210), which are themselves physical sub-division of physical flash pages F-Pages 208. In some embodiments, there is one E-Page per F-Page, i.e., the F-Pages are not sub-divided. The L-Pages may cross the underlying physical boundaries of the E-Pages, F-Pages, as well as the boundaries of the dies/blocks/units within the non-volatile solid-state memory 140 (as shown by boundary 217). For example, as shown, L-Pages may be distributed across multiple E-Pages. In an example implementation, an E-Page 210 may have a data portion 214 protected by an ECC portion 216. In some implementations, compression may be used to further change the size of the L-Page as written to the non-volatile solid-state memory.

Figure 3A:
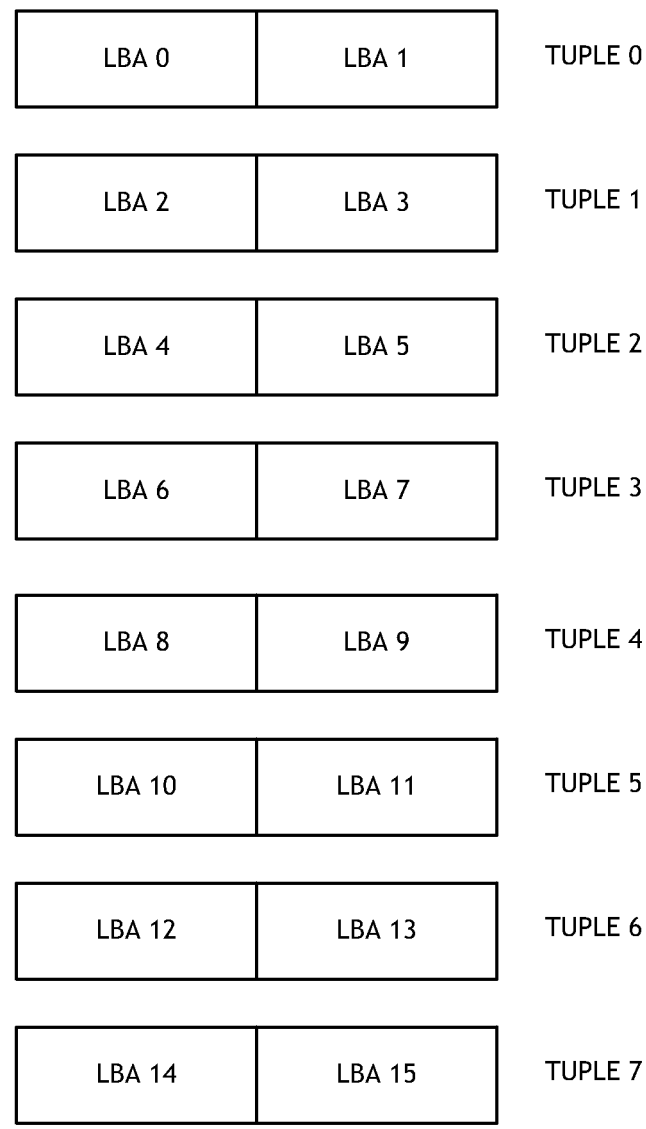

In one embodiment, the size of the logical page is configured to be equal to the size of a tuple of the database, or an integer multiple of it. Due to this flexibility in the logical page size, a database administrator, when designing/configuring the database, can create a matching correlation between the stored data and the access index. For example, as shown in FIG. 3A, if one tuple takes 2 logical pages, in order to read tuple 7, read logical block addresses (LBAs) 14 and 15 would be read. Having the data indexed based on logical address provides many advantages, including eliminating the overhead of partitioning by the host system's operating system (OS) and allowing the use of all available storage.

In addition, the logical page and database data alignment may allow for selective skipping of certain logical page ranges in query operations (for example, during the execution of the action in the block 172 in FIG. 1B). For example, in FIG. 3B, the data record is set up so that the logical page boundaries are aligned with individual fields of a database record. For example, if a user is interested in accessing just the name and address fields, targeted reads can be executed to read L-Page 0 and L-Page 1. It can be appreciated that the example shown in FIG. 3B shows one record and that the same principle can be extended to the case when reading many different records. Following this example further, because of the field and logical address alignment, the index to certain fields can be accessed by a modulo operation on the logical address. By allowing the skipping of certain logical address(es) in the preconfigured logical page arrangement, the database performance can be substantially improved over conventional approaches in which all data is read and then matching results are filtered and provided. In addition, the logical page address can be accessed based on formula and/or condition. For example, different database users may have different access privileges. One user may only have access to the name, address, and phone fields. So for that user, a logic may be formulated such that his query would be blocked from accessing L-Page 3, N+3, 2N+3, etc., as well as L-Page 4, N+4, 2N+4, etc. where N is the number of fields in the record. Another user who has a higher access privilege may access additional fields such as social security number and account number, and a formula based on different logic can be used to allow that access. The different queries as a result of the different access privileges are efficiently handled when the fields are aligned with the logical page boundaries, allowing the data storage device to perform the filtering that is common to many database operations at the storage device's logical address level.

In one embodiment, the data storage device includes a dedicated buffer for query processing, e.g., the query processing buffer 160 shown in FIG. 1, or "QPB." In one embodiment, the QPB is a part of a data path and is capable to hold one logical page.

In addition, in one embodiment, the data storage device includes a buffer to hold a response to the host query, e.g., the host response buffer 162 shown in FIG. 1, or "HRB." The size of the buffer in one embodiment is an integer multiple of the logical page size but can be different depending on the configuration.

In one embodiment, the data storage device includes a dedicated processor to execute host-provided code (xenocode, or XC). In one embodiment, xenocode shall have as minimum read access to the query processing buffer 160 and read/write access to the host response buffer 162. In one embodiment, the data storage device includes a code memory for the xenocode (XC memory or XCM), as shown in element 150 of FIG. 1. The size of XCM may be sized to be large enough to execute queries. In addition, in one embodiment, the data storage device has a set of control registers (XCR) allowing the storage device's hardware and firmware (e.g., 148 in FIG. 1) to communicate with the xenocode and providing hardware mechanisms to reset and un-reset the xenocode. In one embodiment, a "watchdog" function is provided such that the execution of the xenocode is monitored for hung or timed-out condition so that the device's hardware/firmware can reset the execution of the xenocode and prevent the entire storage device from hanging and timing out.

In one embodiment, the data storage device is configured to provide to the host information about XC type, size of the XCM and HRB, XCR configuration, and execution timing. This information can be provided electronically or in the product documentation.

Query Execution Flows

Figure 4A:
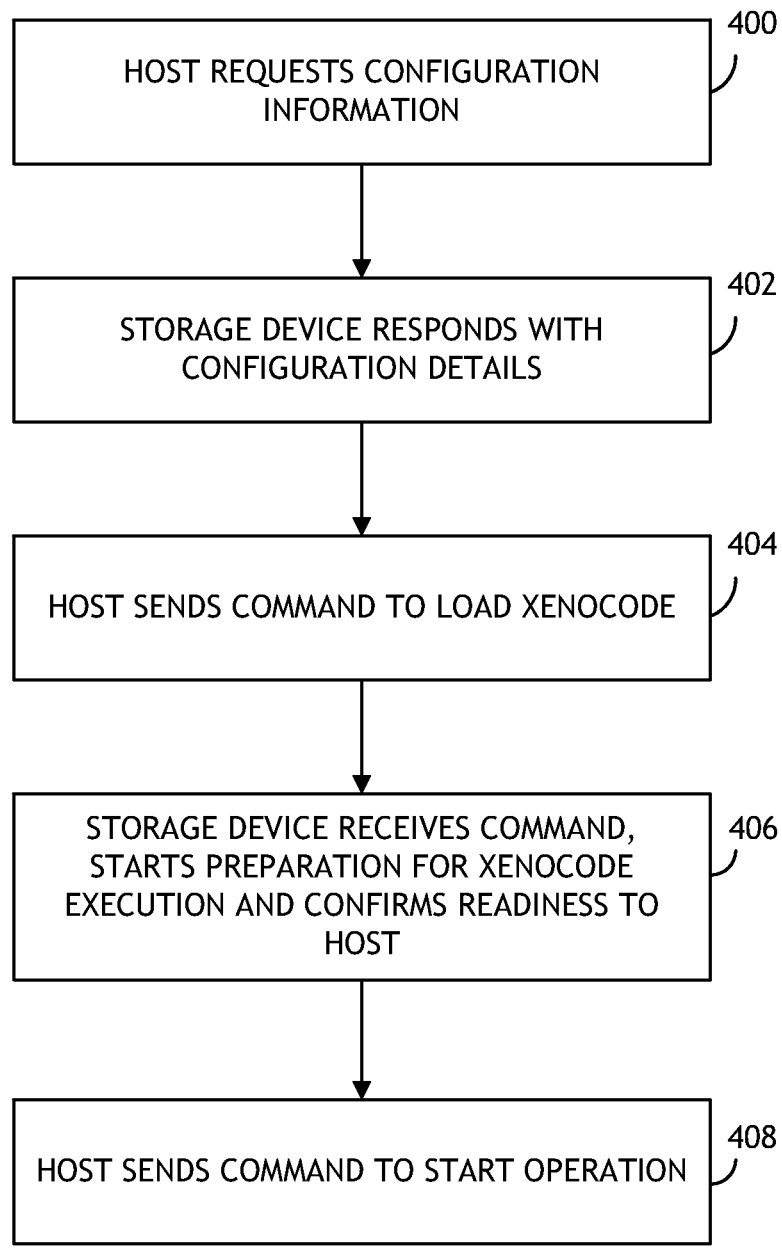
FIGS. 4A and 4B are flow diagrams showing how a filtered read operation may be executed according to one embodiment.
Figure 4B:
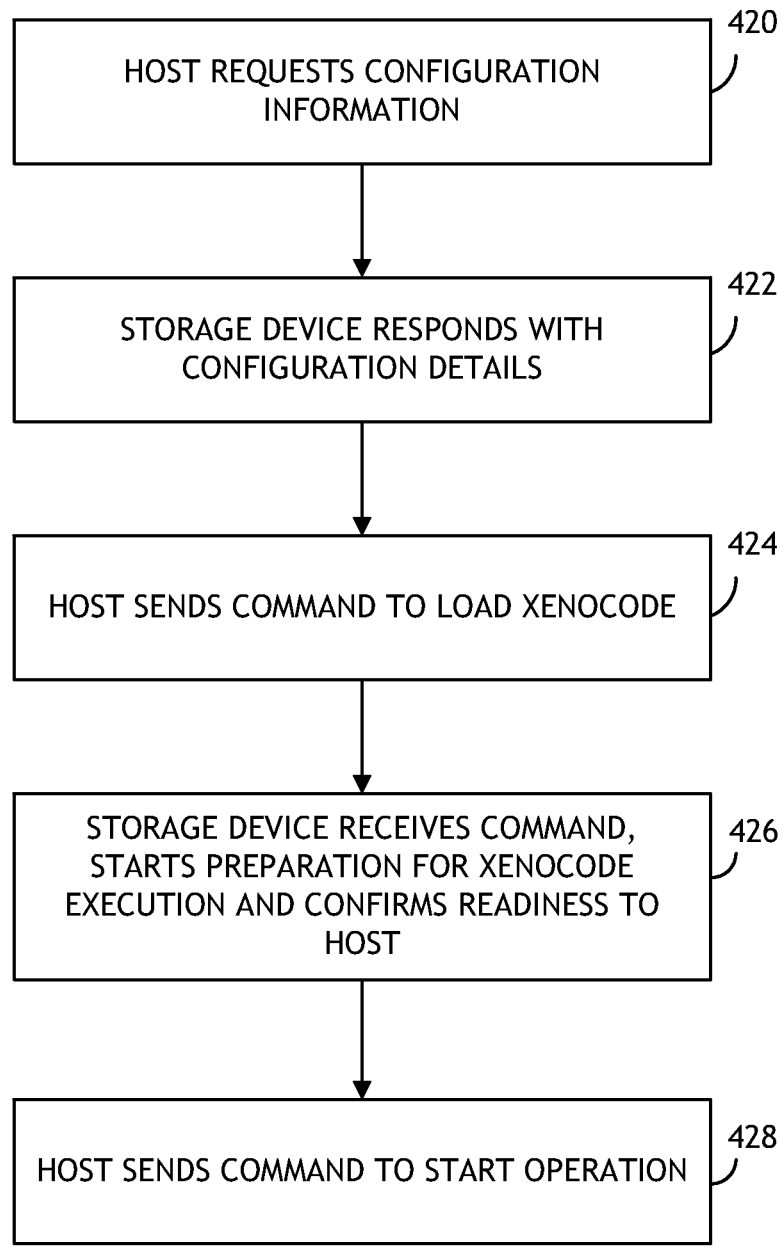

In one embodiment, the data storage device may be filled with relational database tuples in accordance with the description above. FIGS. 4A and 4B shows how a filtered read may be executed. FIG. 4A shows some of the initialization that takes place in anticipation of the query execution. In block 400, the host system requests configuration information from the data storage device. The information may be related to various settings including xenocode set up information. In block 402, the data storage device responds with the requested configuration information, including details such as XC type, XCM size, QPB and HRB mapping, execution time, etc. In block 404, the host system sends a command (e.g., a vendor specific command (VSC)) to load the xenocode for execution. The xenocode could have been previously sent by the host system for storage in the XCM or the solid-state memory of the data storage device. This allows for maximum flexibility by the host to configure/alter the xenocode as needed, while offering the benefits of optimized query execution that is localized with the data storage. In one embodiment, hardware may be used to further speed up these operations. In block 406, the data storage device receives the command, starts preparation for the execution of the xenocode, and confirms readiness to the host system. The preparation work may include filling up the XCM with a given image, clearing up the HRB etc. In block 408, the host system sends a command (e.g., VSC) to start the operation (e.g., in this case, XC-filtered read with a set of logical pages).

FIG. 4B shows a part of the flow of the filtered read operation. FIG. 4B shows the actions performed for every logical page in the set. In block 420, the data storage device reads the next logical page into the query processing buffer. In block 422, the data storage device releases the reset of the xenocode. The reset is related to the watchdog monitor to ensure that the code executes properly and does not result in a hung condition. Then in block 424, the code in the xenocode memory is executed. If the query result is successful, the xenocode writes an indication to the xenocode register (e.g., XCR.Good=1), in block 426. In one embodiment, when xenocode execution is completed, it writes a completion indication in the xenocode register (e.g., XCR.Done=1). This causes the data storage device to send the logical page to the host system (e.g., via the host response buffer) and reset xenocode (block 428). In one embodiment, if the xenocode takes too long to execute, the watchdog resets the xenocode. The logical page is considered to not match the query. As a result of the execution in FIGS. 4A and 4B, the data storage device may internally read all the database tuples, but only matching records are transferred to the host. This localized processing reduces the amount of data transfer and thus increases data throughput. The processing can further be coupled and/or supplemented with the storage device's hardware acceleration to deliver even better improvement. In one implementation, this filtered read operation may be performed in addition to the filtered reads based on logical addresses as previously described.

Figure 5:
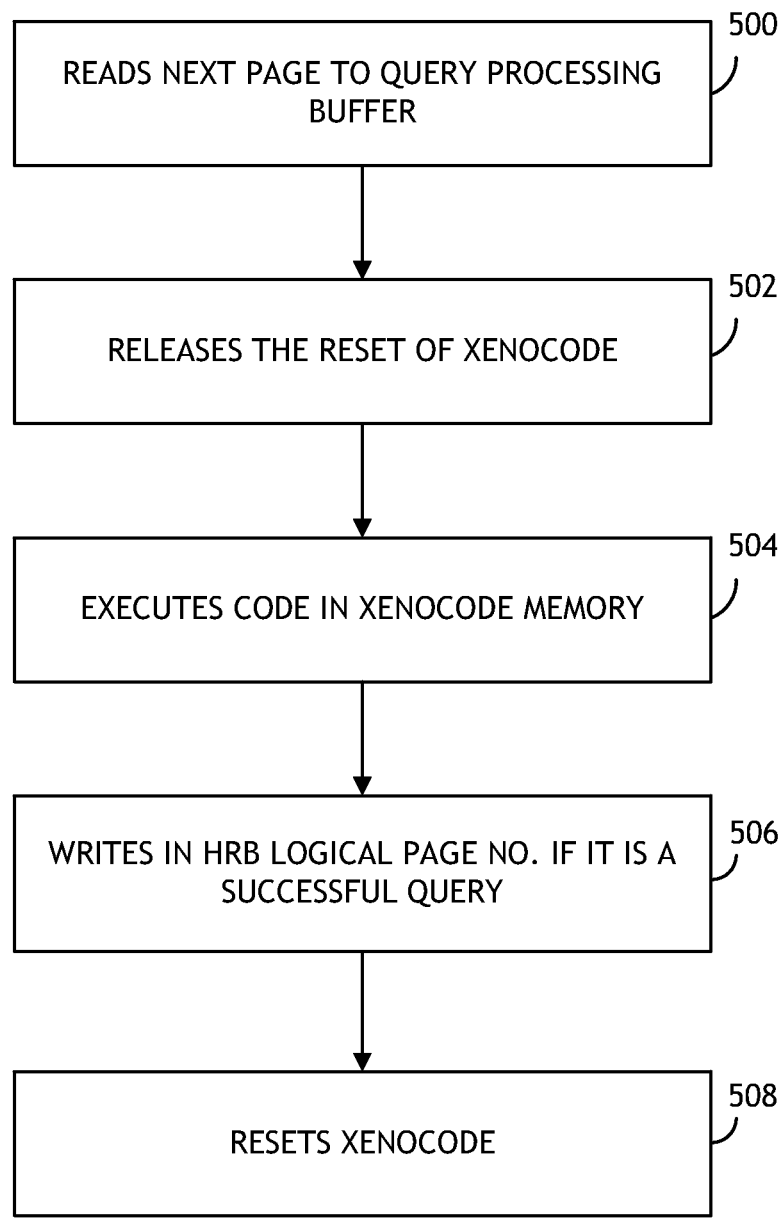
FIG. 5 is a flow diagram showing how an indexing operation may be executed according to one or more embodiments.

In one embodiment, an indexing operation may take place as follows. Much like FIG. 4A, the host system and the data storage device may perform some initialization operations. Once the initialization is completed, in one embodiment the host system sends a command (e.g., VSC) to create xenocode-assisted subset of logical pages with a set of logical pages. The process flows for each logical page in the set is shown in FIG. 5. The data storage device reads the next logical page to the query processing buffer in block 500. In block 502, the data storage device releases the reset of the xenocode. Then in block 504, the code in the xenocode memory is executed. If the query result is successful, the xenocode writes to the host response buffer the logical page number (e.g., XCR.Page), in block 506. In one embodiment, when xenocode execution is completed, it writes a completion indication in the xenocode register (e.g., XCR.Done=1). This causes the data storage device to reset xenocode (block 508). The logical page may also optionally be sent to the host system. In one embodiment, if the xenocode takes too long to execute, the watchdog resets the xenocode. In such case, the logical page is considered to not match the query. After the set is completed, the data storage device sends to the host system the content of the HRB, giving the host system the results of the index operation. In one embodiment, instead of, or in addition to, returning set of the matching pages, the xenocode may provide more sophisticated operations, such as calculating average values, or doing other statistical analysis.

In one embodiment, the data storage device may provide configurable watchdog timing to better match xenocode execution with expected traffic.

In one embodiment, the data storage device can go beyond read-only access to the data content. For example, the xenocode can provide read-modify-write operations if necessary. The data storage device may implement this functionality by supporting write access to the query processing buffer by the xenocode, and providing the ability to write the modified logical page back to the solid-state memory. The xenocode, for example, may be configured to read out a page matching certain value, perform some operation, and write the modified page back to the solid-state memory. This can be done without data transfer between the host system and the data storage device and without requiring the host system's processing power to perform such operations.

On-Device Data Analysis

Figure 6:
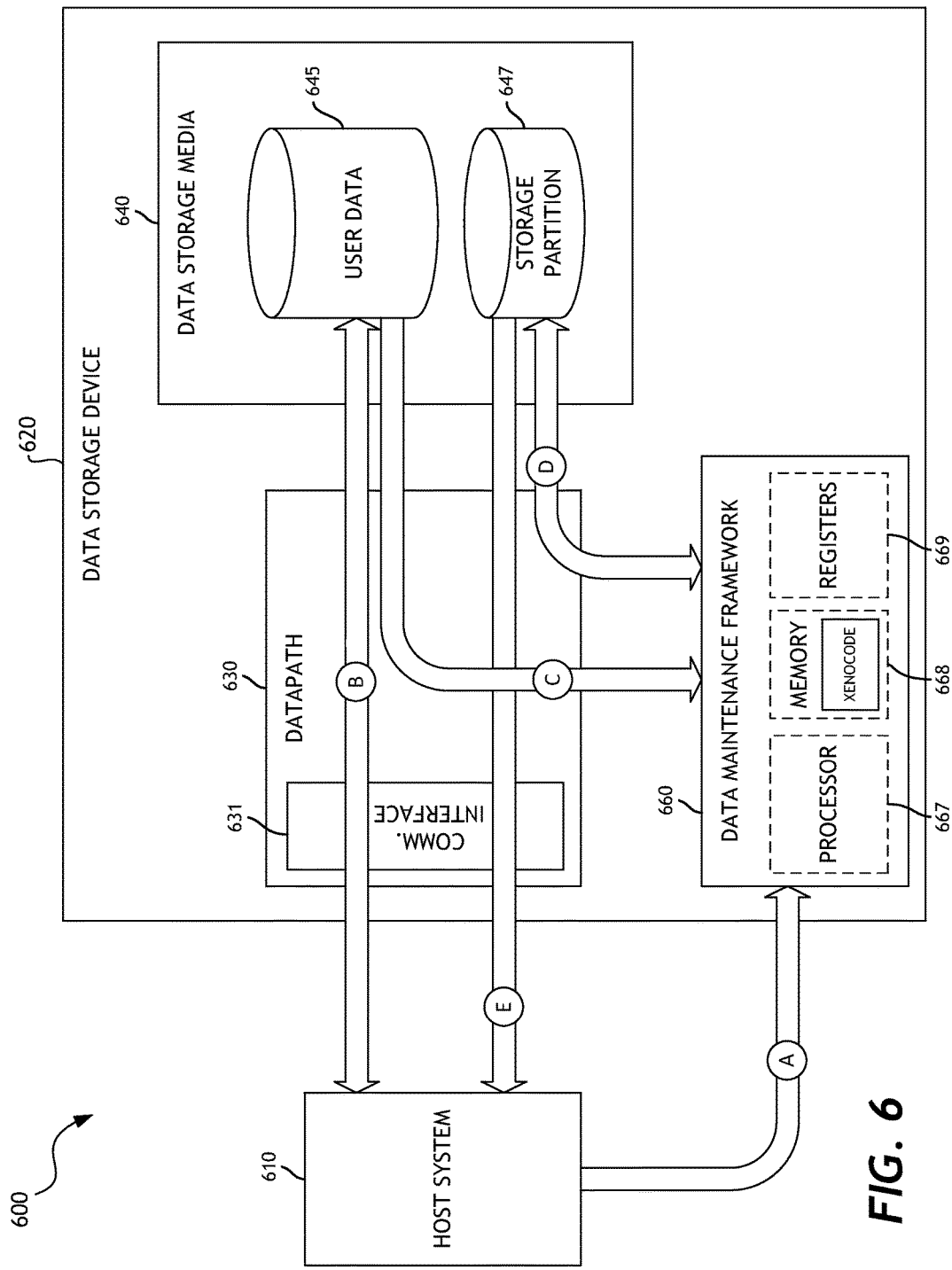
FIG. 6 is an example data storage device according to one or more embodiments.

FIG. 6 is an example data storage device according to one or more embodiments. The system 600 includes a data storage device 620 and a host system 610, which may be communicatively coupled to the data storage device 620 over a data communication interface 631. Examples of communication interfaces may include, but are not limited to, SATA, eSATA, USB, IEEE 1394 (FireWire), Serial Attached SCSI (SAS), PCIe, Thunderbolt, and the like. The data storage device 620 may be configured to receive data storage access commands from the host system 610 over the interface 631. In certain embodiments, the data storage device 620 may be configured to perform on-device data analysis, as described herein.

In one embodiment, the data storage device 620 extends the various concepts illustrated through the example storage device 120 shown in FIG. 1A. As such, most of the description from FIG. 1A is applicable to the various embodiments illustrated through FIG. 6. As shown in FIG. 6, the data storage device 620 includes a data maintenance framework 660. The data maintenance framework 660 may comprise a framework for storing and/or executing xenocode within the data storage device 620. For example, the framework may include one or more processors 667, registers 669 or memory modules 668 for storing and executing the xenocode. As used herein, "xenocode" may mean externally-sourced code provided by a host system for execution within the data storage device. For example, xenocode may be externally-compiled code provided to the data storage device 620 post-processing as a complement to the device firmware. In certain embodiments, xenocode may operate as a software plug-in designed to enhance the functionality of the device firmware and may be executable at least partially independently of the device firmware. In certain embodiments, the xenocode is compiled externally by the host 610, wherein the data storage drive 620 receives the xenocode as, for example, binary code, or as run-time code. The data maintenance framework 660 may comprise a platform for executing the binary xenocode received from the host 610.

The framework of the data maintenance framework 660 may allow for post-processing download of xenocode from the host system 610, thereby allowing for the implementation custom code. For example, while firmware design may not substantially allow for xenocode functionality addressing unforeseen use cases, the data maintenance framework 660 may allow for addition to the data storage device 620 of application-specific xenocode provided by the host system 610. While certain embodiments may be described herein in the context of executing xenocode, the data maintenance framework 660 need not be implemented as such. For example, certain functional aspects of some embodiments may instead involve firmware code executed within the data storage device 620.

As described above in greater detail in the context of xenocode solutions, data storage devices may be configured to execute externally-sourced code (e.g., xenocode), which may be provided by the host system 610, for implementing database operations within the data storage device. Whereas the controller 130 in FIG. 1B can receive database operation xenocode/firmware that is configurable by the host and execute the database operation xenocode/firmware on the data stored within storage device 120, the data storage device 620 extends this concept by accepting, from the host system 610, xenocode usable for a wide variety of purposes for execution on the user data stored in partition 645.

In one embodiment, the external code (i.e., xenocode) may be maintained by the data maintenance framework 660 in a dedicated memory 668 (similar to how memory 150 is used in FIG. 1B), or may utilize a shared memory module of the data storage device 620. In addition, in one embodiment, the data maintenance framework 660 operates with a set of dedicated control registers 669, wherein the data maintenance framework 660 may be configured to communicate with storage device's hardware and/or firmware (not shown) using the registers 669.

In certain embodiments, the data maintenance framework 660 comprises one or more dedicated processors 667. In certain embodiments, the data maintenance module utilizes a processor of the device controller of the data storage device 620 (not shown) in executing commands.

FIG. 6 illustrates various data communication paths over which the respective components of the system 600 may communicate in performance of on-device data analysis. For example, a transaction 'A' is illustrated, wherein the host system 610 loads xenocode containing processor executable instructions, e.g., a data maintenance application package to the data maintenance framework 660. In certain embodiments, the application package comprises a permanent or long term xenocode applet. The host system 610 may further store user data to be analyzed by the data storage device 620 in data storage media 640 of the data storage device 620 through an existing hardware datapath 630.

The data maintenance framework 660 may be referred to herein as a data "agent," "xenocode," "xenocode module," or the like. Furthermore, although certain embodiments are disclosed herein in the context of data maintenance operations performed by the data maintenance framework 660, it should be understood that operations performed by the module 660 may involve any type of analysis, maintenance, searching, or other types of operations associated with data. In certain embodiments, the data maintenance framework 660, which may comprise a xenocode engine, may be part of the controller system on chip (SOC) of the data storage device 620. In certain embodiments, the data maintenance framework 660 may comprise a field-programmable gate array (FPGA) configured to execute externally-sourced xenocode in accordance with concepts disclosed herein. In the system 600, the operation of the data maintenance framework 660 may be effectively merged into the existing datapath 630 of the data storage device 620.

In certain embodiments, the data storage media 640 is divided into at least two logical partitions. For example, the data storage media 640 may include a user data partition 645, which may be read/write accessible to the host system 610. The data storage device 640 may further include a logical partition reserved for use by the data maintenance framework 660. Although certain embodiments are described herein in the context of logical partitions of the data storage media 640 for user data and application data, it should be understood that certain embodiments may comprise physically separate storage devices or partitions rather than, or in addition to, logical partitions.

In certain embodiments, when user data has been written to the user data portion 645 of the data storage media 640, as illustrated by the data transaction 'B' in FIG. 6, data maintenance execution may be initiated, based on the xenocode in the memory 668 previously received from the host system 610. For example, the data maintenance framework 660 may read user data stored on the user data partition 645 for analysis (transaction 'C'). Such operation may be performed as a background operation. For example, the data maintenance framework 660 may be configured to select an anticipated relatively low load duty time for performance of data analysis/operations in order to reduce the performance impact of such data analysis operations. In certain embodiments, the execution of the data operations may be at least partially coordinated with firmware execution. In addition to monitoring for low-duty periods, other factors, such as environmental conditions and the like may be used to determine when the execute data operations. By implementing data operations through xenocode execution, embodiments disclosed herein may advantageously provide improved user freedom with regard to when maintenance/analysis operations are performed in the data storage device 620.

The data operation(s) performed by the data maintenance framework 660 may be any kind of data maintenance or analysis operations. For example, the data maintenance framework 660 may be programmed to perform data indexing, such as for search engine use, data de-duplication, virus searching, statistical data analysis, etc. In certain embodiments, results generated during data analysis may be stored by the data maintenance framework 660 in the dedicated partition 647, as illustrated in transaction 'D.'

The host system may have read access to the dedicated partition 647 for the purpose of retrieving results of data analysis performed by the data storage device 620. As shown at transaction 'E,' the host system 610 may access data analysis results, as well as possibly analysis log files and/or metadata stored in the dedicated partition 647.

In certain embodiments, the data storage device 620 implements various data access limitations with respect to the operation of the data maintenance framework 660. For example, in certain embodiments, the host system 610 may read from and write to the user partition 645, though the host system 610 may only read from the dedicated/hidden partition 647 through data or non-data (e.g., custom, vendor specific) commands, but cannot write to it. The data maintenance framework 660, on the other hand may, may have read and write access to the dedicated partition 647, but may only have read access with respect to the user partition 645, which it may access through internal methods, for example. Any write operations, such as initialization or erase to the dedicated partition 647 may only be performable through the data maintenance framework 660. In addition, the host system 610 may be able to read the status of the data maintenance/analysis activity of the data maintenance framework 660 through non-data commands.

Unlike certain systems described above, the system 600 of FIG. 6 may allow for data maintenance operations, wherein data storage available for use by the data maintenance framework is not limited to a finite number of registers, or to one logical page. Rather, the data maintenance framework 660 may have a relatively large dedicated portion of the data storage device's media. The greater storage space available for use by the data maintenance framework 660 may allow for execution of more complex operations requiring large amounts of buffered data. In addition, while some systems disclosed herein may be limited in the number and complexity of operations executed (e.g., queries), the system 600 may be able to perform relatively constant and/or complex background data scanning/monitoring and operations.

The hardware and firmware of the data storage device 620 may be configured to perform generic reads and writes as commanded by the host during normal operation, as well as additional reads and writes based on the external xenocode executed by the data maintenance framework 660. The host system 610 may be configured to effectively initialize and configure the data maintenance framework 660 in the data storage device 620, which may operate with a processor that is part of the data storage device's controller system on chip (SOC), or the module 660 may operate with a separate, dedicated processor 667.

In certain embodiments, the data storage device provides the necessary framework required by the host to implement the data maintenance framework 660, such as, for example, a dedicated processor 667, memory 668, one or more communication registers for communication between the data maintenance framework 660 and the main controller to allow for reading and writing of data by the module 660 to/from the data storage media 640. In certain embodiments, the data maintenance framework 660 may be configured to utilize interrupts for the purpose of alerting the drive firmware. Data storage access instructions may be communicated between the module 660 and the device controller using the registers 669 as a communication interface. When an interrupt to the main controller firmware is received, the firmware may reference the registers 669 to determine what type of activity is to be performed on behalf of the data maintenance framework 660.

The data maintenance/analysis operations performed on the user data by the data maintenance framework 660 may be any type of data operations. For example, in an embodiment, the user data may comprise image data, wherein the data maintenance framework 660 is configured to execute preprocessing for thumbnail images, facial or other image-recognition analysis, or the like, wherein data generated by the data maintenance framework 660 in connection with such operations may be stored in the dedicated storage partition 647 of the data storage media 640.

By performing data operations on the data storage device 620, the host 610 may be able to obtain data maintenance/analysis results without having to perform such maintenance/analysis itself. In certain embodiments, such a configuration may allow for the host system 610 to obtain data operation results more quickly than would otherwise be possible. For example, data would no longer have to be transferred across the interface between the data storage device to the host system in order to perform the maintenance/analysis. By integrating the data operation code in closer proximity to the data storage media 640, the performance of the system 600 may be improved.

Figure 7:
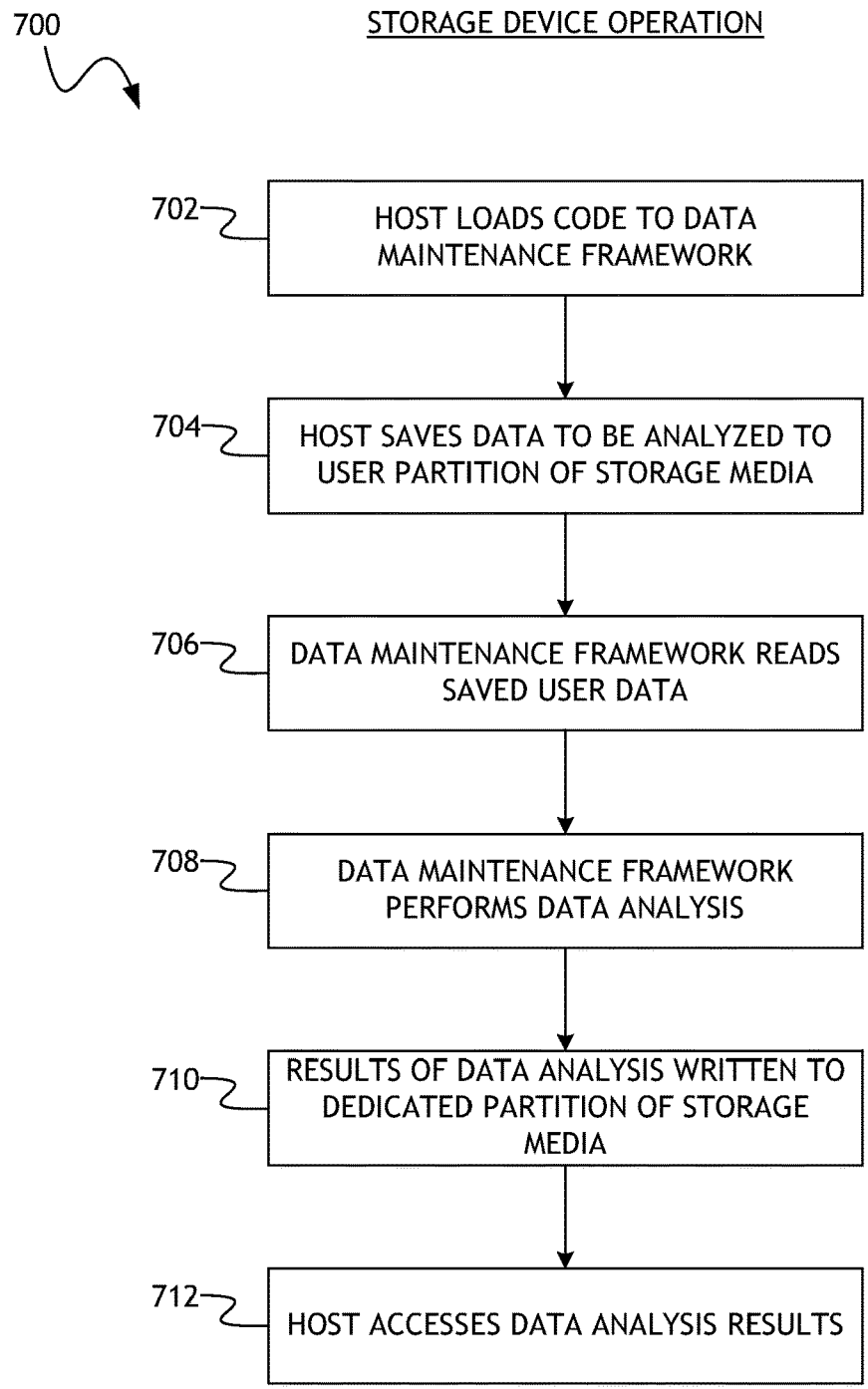
FIG. 7 is a flow diagram showing a process for performing data analysis according to one or more embodiments.

FIG. 7 is a flow diagram showing a process 700 for performing data analysis according to one or more embodiments. The process 700 may correspond at least in part to certain of the transactions illustrated between the various components of FIG. 6, and described above. The process 700 may include a host or host system loading code to an application framework, such as a xenocode framework, of the data storage device (which may be part of the data maintenance framework 660), as shown at block 702 of FIG. 7. The application framework is configured to execute the external code from the host in the data storage device.

The process 700 may involve receiving one or more data storage access commands associated with user data from the host system. At block 704, the host system may save user data to be analyzed to a user partition of storage media of the data storage device. For example, the user data may comprise data upon which various data analysis and/or maintenance operations may advantageously be performed. Said saving of the user data to the user partition may be performed in response to the receiving of the one or more data storage access commands. In order for the data storage device to perform analytics/maintenance on the user data stored in the data storage devices storage media, the application framework, at block 706, may be configured to read the saved user data in order to operate thereon. For example, the xenocode framework may be configured to store the user data temporarily in a dedicated memory associated with the xenocode framework, or in some other memory of the data storage device. Once the data has been read from the user data partition of the data storage media, the application framework may then perform data analysis/maintenance on the data by executing at least a portion of the external code received from the host system.

At block 710, the process 700 involves storing results of the data analysis/maintenance to a dedicated partition of the storage media of the data storage device. For example, the dedicated partition may be a substantially hidden logical partition of the storage media. The dedicated partition may be accessible through read access by the host, wherein the host may thereby retrieve at least some of the result data written by the application agent (e.g., xenocode framework) to the dedicated partition of the storage media.

Interleaved Dedicated Partition

Figure 8:
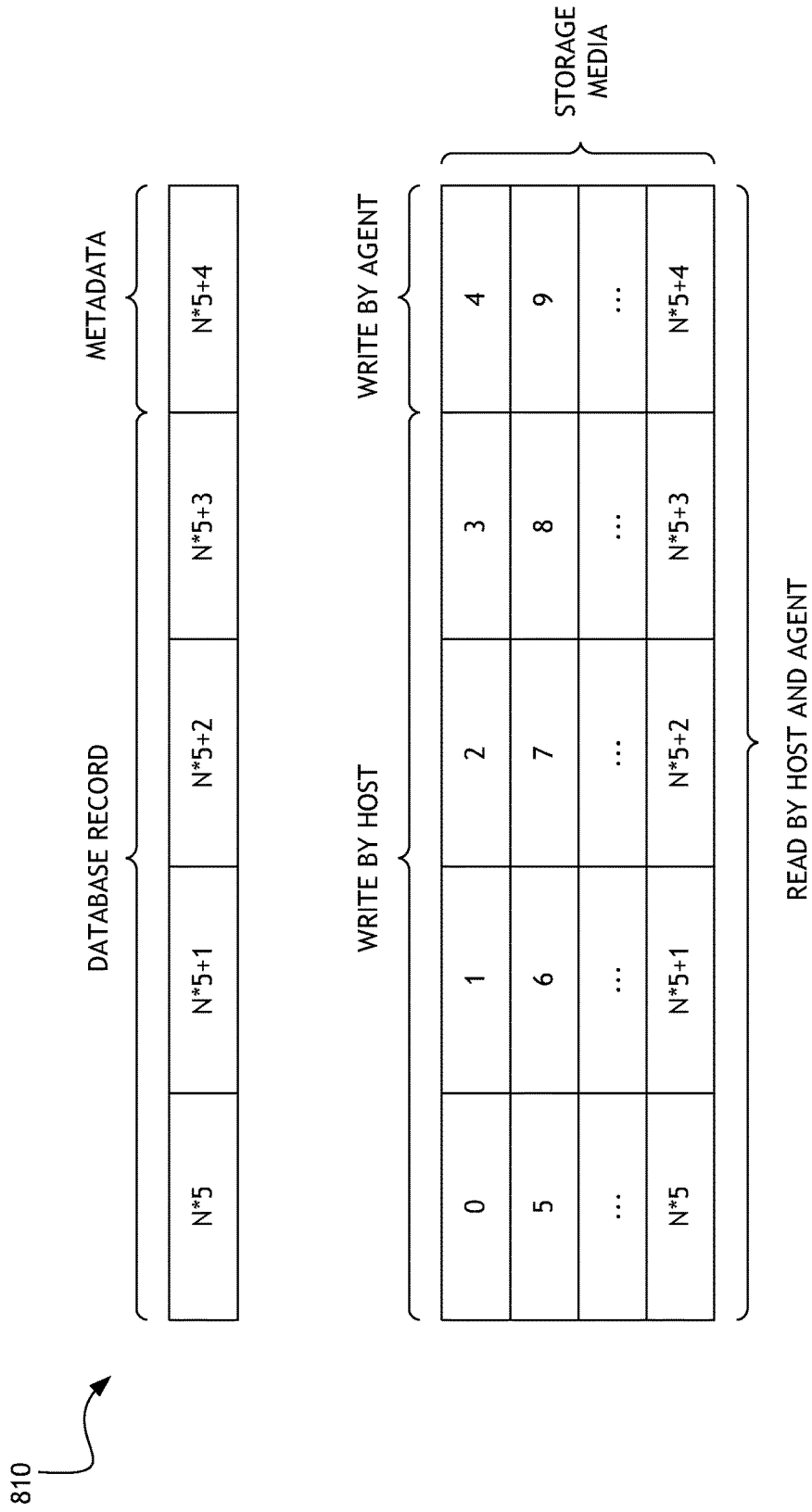
FIG. 8 shows example database records according to one or more embodiments.

In certain embodiments, the user data partition and dedicated partition for use by the data maintenance/analysis agent or module, as described above with respect to FIGS. 6 and 7, may be mixed or interleaved together in an integrated physical unit or module of data storage. For example, the data stored by the application agent in connection with its operations may be stored after segments of user data, as shown in FIG. 8. FIG. 8 shows example database records according to one or more embodiments, wherein metadata generated by the application agent is stored interleaved with user database records. For example, if database record allocates four LBAs for a single database record, as shown, and wherein the application agent utilizes one LBA for a given database record or operation or group of operations, the device partitioning 810 as shown may be used, wherein for every four LBA or blocks of data utilized for user data storage in a given segment of data storage media of a data storage device, one or more LBAs or blocks of agent-written data may be stored.

In certain embodiments, where agent-sourced metadata is interleaved with user data, an edge or other portion of a partition may contain, for example, indexing for the database. As shown, every $N^{th}$ LBA, or other unit of storage, may be reserved for use by the application agent.

In certain embodiments, the agent-sourced metadata may be associated with the record it is attached to, or otherwise associated with. For example, as shown, the metadata $N*5+4$ shown in connection with the database record 810 may be associated with the user data stored in LABs/units $N*5-N*5+3$. As an example, the host may be configured to reserve the fifth LBA, wherein a value associated with an average of the four LBAs of user data is maintained by the application agent in the reserved fifth LBA; changes in the four (or other number, depending on the embodiment) records may trigger recalculation and re-storage of metadata by the application agent. Alternatively, the metadata LBA/unit could comprise at least a portion of a thumbnail or other image recognition information associated with an image at least partially represented in the data stored in the user database record portion.

Additional Embodiments

Those skilled in the art will appreciate that in some embodiments, other types of data analysis methods and/or systems can be implemented while remaining within the scope of the present disclosure. In addition, the actual steps taken in the processes discussed herein may differ from those described or shown in the figures. Depending on the embodiment, certain of the steps described above may be removed, and/or others may be added.

While certain embodiments have been described, these embodiments have been presented by way of example only, and are not intended to limit the scope of protection. Indeed, the novel methods and systems described herein may be embodied in a variety of other forms. Furthermore, various omissions, substitutions and changes in the form of the methods and systems described herein may be made. The accompanying claims and their equivalents are intended to cover such forms or modifications as would fall within the scope and spirit of the protection. For example, the various components illustrated in the figures may be implemented as software and/or firmware on a processor, application-specific integrated circuit (ASIC), field-programmable gate array (FPGA), or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

What is claimed is:

1. A data storage device comprising:
   non-volatile data storage;
   an interface for receiving data storage commands from a host system; and
   a framework including a memory for storing xenocode received from the host system and a processor for executing the xenocode, wherein the xenocode comprises executable code configured by the host system, and wherein the configured executable code is further compiled by the host system prior to the memory storing the xenocode received from the host system;
   wherein the data storage device is configured to write user data received from the host system to a first partition of the non-volatile data storage in response to a storage command received via the interface from the host system; and
   wherein the xenocode, when executed, causes the processor to:
      read the user data from the first partition of the non-volatile data storage without using the interface;
      perform data operations on the read user data; and
      write results associated with the data operations in a second partition of the non-volatile data storage without using the interface.

2. The data storage device of claim 1, wherein the xenocode further cause the data storage device to provide at least a portion of the results to the host system.

3. The data storage device of claim 2, wherein said providing the at least a portion of the results to the host system is performed in response to a request from the host system.

4. The data storage device of claim 2, wherein said providing the at least a portion of the results to the host system is performed according to a predetermined schedule.

5. The data storage device of claim 1, wherein the xenocode comprises a non-native software application.

6. The data storage device of claim 1, wherein the first and second partitions of the non-volatile data storage are physical partitions.

7. The data storage device of claim 1, wherein the first and second partitions of the non-volatile data storage are logical partitions.

8. The data storage device of claim 1, wherein the data storage device is configured to determine a low-duty period of time and cause said data operations to be performed at least partially during the low-duty period of time.

9. The data storage device of claim 1, wherein the data storage device is configured to cause the data operations to be performed in coordination with execution of firmware of the data storage device.

10. The data storage device of claim 1, wherein the data operations include one or more of indexing, data de-duplication, virus searching, and statistical analysis.

11. The data storage device of claim 1, wherein the data storage device is further configured to prevent the host system from writing to the second partition.

12. The data storage device of claim 1, wherein the processor is part of a device controller.

13. A method of performing data operations in a data storage device comprising non-volatile data storage and a memory, the method comprising:
   receiving xenocode comprising processor executable instructions from a host system, wherein the xenocode comprises executable code configured by the host system, and wherein the configured executable code is further compiled by the host system;
   storing the xenocode in a memory of a framework for storing and executing the xenocode in a data storage device, wherein storing the xenocode in the memory occurs after the configured executable code is compiled by the host system;
   receiving a storage command from the host system over a communication interface;
   writing user data associated with the storage command and received from the host system to a first partition of a non-volatile data storage of the data storage device in response to receiving the storage command;
   executing the xenocode to cause a processor of the framework to:
      read the user data from the first partition of the non-volatile data storage without using the communication interface;
      perform data operations on the read user data; and
      write results associated with the data operations in a second partition of the non-volatile data storage without using the communication interface.

14. The method of claim 13, further comprising providing at least a portion of the results to the host system.

15. The method of claim 14, wherein said providing the at least a portion of the results to the host system is performed in response to a request from the host system.

16. The method of claim 14, wherein said providing the at least a portion of the results to the host system is performed according to a predetermined schedule.

17. The method of claim 13, wherein the xenocode comprises a non-native virtual software application.

18. The method of claim 13, wherein the first and second partitions of the non-volatile data storage are physical partitions.

19. The method of claim 13, wherein the first and second partitions of the non-volatile data storage are logical partitions.

20. The method of claim 13, further comprising determining a low-duty period of time and performing said data operations at least partially during the low-duty period of time.

21. The method of claim 13, wherein the data operations include one or more of indexing, data de-duplication, virus searching, and statistical analysis.

22. The method of claim 13, further comprising preventing the host system from writing to the second partition.

\* \* \* \* \*